United States Patent [19]
Mueller et al.

[11] 3,913,115
[45] Oct. 14, 1975

[54] FILM PERFORATION SENSOR

[75] Inventors: Arthur C. Mueller, Niles; Mervin W. LaRue, Jr., Barrington, both of Ill.

[73] Assignee: Bell & Howell Company, Chicago, Ill.

[22] Filed: May 28, 1974

[21] Appl. No.: 473,522

[52] U.S. Cl. .................. 354/213; 354/215; 354/218
[51] Int. Cl.² .......................................... G03B 1/00
[58] Field of Search ............ 354/213, 215, 217, 218

[56] References Cited
UNITED STATES PATENTS

| | | |
|---|---|---|
| 3,682,066 | 8/1972 | Simon .................................. 354/213 |
| 3,825,939 | 7/1974 | Engelsmann ......................... 354/213 |

*Primary Examiner*—Monroe H. Hayes
*Attorney, Agent, or Firm*—John E. Peele, Jr.

[57] ABSTRACT

A film perforation sensor assembly is provided for determining the extent of film movement as film is advanced following an exposure to locate a new film frame in the exposure aperture of an automatically operated, electrically powered still camera accepting a film cartridge containing film having a single perforation proximate each film frame. To improve the sensitivity of the sensor assembly, a movement multiplier is provided to control actuation of a motor energizing circuit so that film is advanced a predetermined length.

12 Claims, 6 Drawing Figures

FILM PERFORATION SENSOR

The present invention relates to a photographic camera and particularly to an electrically operated still camera accepting a film cartridge of the type having a single perforation per frame of film. An electrically operated camera provides for substantially automatic camera mode sequencing with minimum manual effort upon actuation of a camera actuator control. More particularly, the invention relates to a film perforation sensor assembly for determining the extent of film movement as an unexposed film frame is advanced to the exposure aperture of a camera.

Cameras having electrically powered motors have heretofore been proposed for causing selected camera operations to be automatically sequenced. Some cameras provide for substantially complete automation of the film transport sequence following actuation of the camera to expose a film frame previously located in the exposure aperture of the camera. That is, after the camera actuator control is actuated, the previously set shutter opens to permit a frame to be exposed; when the shutter closes, the motor is energized to position the next film frame for exposure and to reset the shutter for another exposure. Such cameras have complex motor control circuitry and mechanical sensors to approximate the advance of a complete film frame. In many of this type of camera a motor is externally attached to the camera housing, thus requiring additional mechanical and/or electrical connections as well as higher manufacturing limitations to obtain accurate positioning of a film frame at the exposure aperture.

To provide the desired degree of accuracy for a camera manufactured by mass production methods, a novel film perforation sensor assembly is provided. The camera is to receive a film cartridge of the type sold currently by film manufacturers as the 110 format. This cartridge encloses a tightly wound length of film and a corresponding paper backing. The film is of a length to permit a predetermined number of frames to be exposed thereon. Proximate the intended position of each frame, a single perforation is located in the film at a predetermined spacing relative to the position of the frame. Since the perforations may be used for controlling other automatic machinery such as film numbering machines, slide mounting machines, and print making machines, the position of each frame relative to the perforation must be accurate to a small dimension. Thus, film must be located for each of the several exposures so that the frames are repeatedly located with accuracy.

In this preferred embodiment, an improved film perforation sensor assembly is described in addition to other features of the camera required for an understanding of the function of the assembly. The sensor assembly is enclosed within the camera housing adjacent the film path. By a multiplier lever, the movement of the sensor is magnified to enable the assembly to be positively functional through movements only slightly greater than the thickness of the film. The film engaging end of the sensor member is arranged in a track along which perforations are formed in the film and along which these perforations pass during film movement. The novel design of the sensor member and the assembly of which it is a part enables the engaging end thereof to enter the film perforation under the slight urging of a spring. Further, the sensor is retractable from the perforation by light forces applied to the multiplier lever. Additionally, a circuit making and breaking arrangement is provided through operation of the sensor assembly to enable selective energizing of the motor of the camera in response to alternative positioning of the sensor by absence or existence of perforations. The circuitry controlled through the sensor assembly is in series connection with the circuitry controlling the motor by which the film wind mechanism is powered for a period adequate to locate an unexposed frame for exposure. Completion of the film transport cycle occurs when the sensor passes into a film perforation indicating location of a film frame for a forthcoming exposure. During storage and until the next exposure is completed, the sensor end remains in the perforation to reduce the possibility of film creep relative to the exposure aperture which slight movements might occur due either to the tight wind of film in the cartridge or vibration of the camera.

An object of the invention is to provide a positive acting film perforation sensor for locating a film frame in the exposure aperture of a motor driven camera.

Another object is to provide a film perforation sensor having a multiplier lever for amplifying the displacement of the sensor which moves a depth only slightly greater than the thickness of a film.

The above and other objects will be apparent from the description of the accompanying drawings in which like parts are designated by like numerals.

Figure 1:
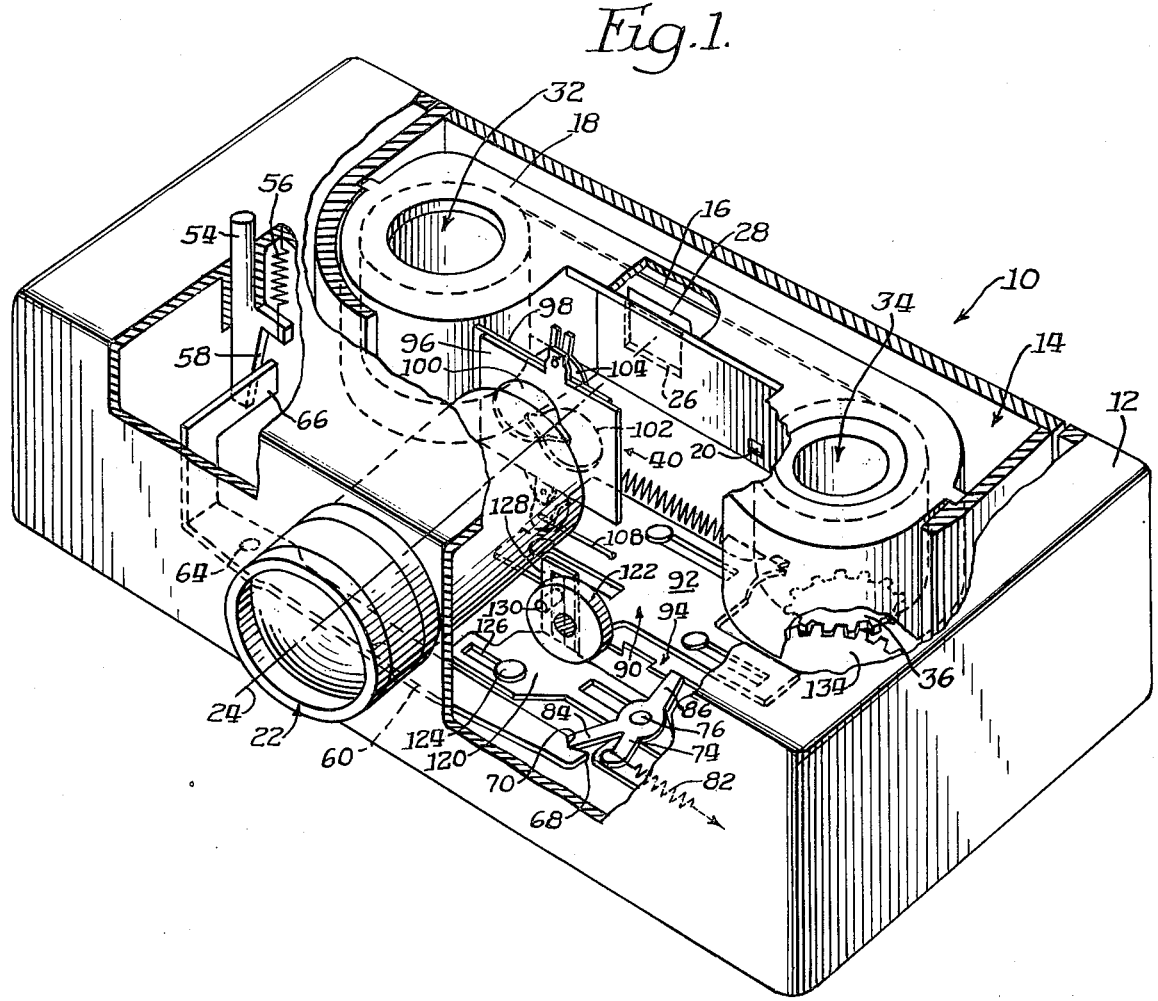
FIGS. 1 and 2 are perspective views of a camera showing primary components with which mechanisms of this invention cooperate, with parts omitted and parts broken away for clarity.

Referring now to FIG. 1 of the drawings, a camera generally designated as 10, is provided with a housing 12. A portion of the housing defines a film enclosing chamber 14 into which a film 16, preferably supplied in a cartridge or cassette 18 can be located. Typically, the film cassette may be of the type currently available in which a film according to the 110 format is supplied. Attached in the cassette in a length of film having a row of pre-located perforations 20 proximate each of which a film frame is to be exposed. When the camera is loaded, the film is arranged in the focal plane of a focusable objective lens 22 which may be attached to the camera housing 12. An optical axis 24 defined by the objective lens is substantially aligned with an exposure aperture 26 through which light passes to impinge on the film to expose a film frame 28. The film in the cassette is attached between a supply or first hub 32 and a take-up or second hub 34, formed with a gear 36 which is accessible to other mechanisms of the camera for winding of the film onto that hub and transporting lengths of film to the exposure aperture for exposure.

Figure 3:
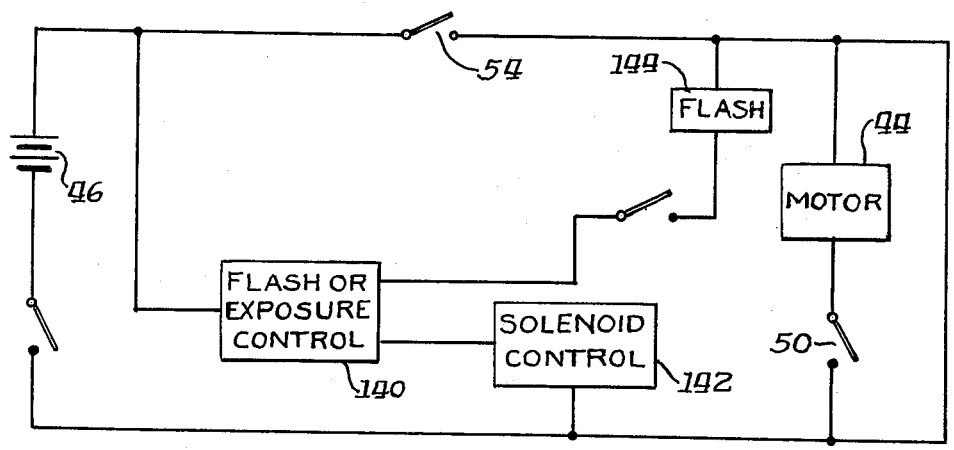
FIG. 3 is a schematic view of principle components of the circuits associated with the mechanism of the invention.

Within the housing 12 of the camera 10 is arranged an exposure control mechanism 40 which in this preferred embodiment is a combined aperture and shutter assembly for controlling the quantity of light permitted to impinge on the film during an exposure. This mechanism may be controlled mechanically or electronically to respond to pre-selected exposure factors or light responsive circuitry. Further enclosed within the housing is a drive motor, shown schematically as 44 in FIG. 3, which motor is selectively energizeable by a power source shown as a battery pack 46 for resetting the shutter following an exposure and for advancing the film to locate another frame area for exposure. The circuitry for selectively energizing the drive motor 44 includes a film perforation sensor assembly represented by switch 50 for terminating film winding when a length of film to next be exposed is transported into alignment with the exposure aperture 26.

Operation of the camera is initiated by an externally accessible camera actuator control, shown as a depressible button 54. The contnrol is coupled to mechanisms internal of the camera for initiating a film exposure and film advancing sequence. The button 54 is normally biased toward an inoperative or camera "off" condition by a spring 56, and has an internal portion 58 which cooperates with a pivoted link member 60 for operating a shutter release device (not shown). The link member 60 is arranged for short stroke pivotal movement about a fixed axle 64 and is normally urged into a ready position by a yieldable member (not shown). Upon depression of the button 54 for camera actuation, the link member is caused to pivot about the fixed axle responsive to the mechanical displacement by the button against a tail portion 66 of the elongated link member. As described in more detail in co-pending application titled SHUTTER SETTING AND FILM ADVANCING MECHANISM FOR AN ELECTRICALLY OPERATED CAMERA by Arthur C. Mueller, Ser. No. 473528, filed of even date and assigned to the same assignee, the shutter is released to initiate the exposure. On the end of the link member 60 opposite the tail portion 66 is formed a toe portion 68 adjacent to a corner shaped recess 70. The toe portion and the recess cooperate with a rotatable multi-fingered lock-nut member 74 to enable and disable actuation of the control button 54 at selected times during an exposure and camera resetting cycle.

The multi-fingered lock-out member 74 is supported for rotational movement about a shaft 76 fixed to a not shown mechanism support plate. A coiled spring 82 is attached to one leg of the lock-out member to urge the lock-out member rotationally in a direction opposite the direction of mechanical displacement by cooperating mechanisms as more fully described hereinafter. Adjacent the spring coupled finger is a link engaging finger 84 against which the toe portion 68 or the corner recess 70 of the link member rests in alternative engagement positions. Following exposure initiation, the lock-out member is released by the link member 60 and is rotated under the influence of the spring member 82 to arrange the link engaging finger in alignment with the toe portion 68 of the link member. In this orientation, the link member blocks another actuation of the control button 54. Following completion of the exposure cycle, the lock-out member is mechanically rotated to displace the link engaging finger 84 into orientation with the corner recess of the link member to again enable the link member to be pivoted. In response to orientation of the link member to this position, the control button can again be actuated to start a new camera operation cycle. The mechanical rotation of the lock-out member occurs when a third finger 86 iss engaged and mechanically displaced by other components of the camera, including a shutter control assembly 90.

The mechanical actuation of the lock-out member 74 to the shutter enabling position occurs when a portion of the shutter control assembly 90 is displaced to a shutter closed orientation at the end of an exposure cycle. The shutter control assembly includes a shutter control plate 92 and a shutter resetting plate 94 which together cause sequential opening and closing of the aperture-shutter components of the exposure control mechanism 40. As shown schematically in FIG. 1, the aperture-shutter assembly 40 includes a pair of relatively reciprocable opaque plates or blades 96, 98 provided with cooperating apertures 100, 102. A ring member 104 is coupled to the blades to adjust the blades from completely open aperture condition to a completely closed aperture condition in which the apertures are overlapped by opaque portions of the blades. Rotation of the ring member is controlled by the shutter control plate 92 through a control rod 108 coupling the ring member and the control plate. For exposure, the control late reciprocates the control rod to rotatably drive the ring member and thereby reciprocate the blades to align a portion of the apertures 100, 102 about the optical axis 24 for a limited period of time during which light can pass to impinge on the film 16. Thereafter, the blades are returned to the aperture blocking-shutter closed conditions whereby exposure is terminated.

Figure 2:
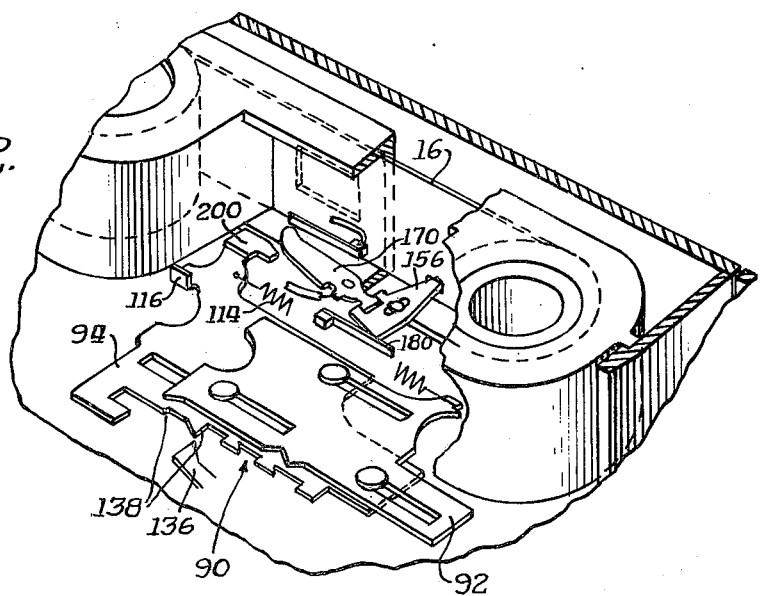
Figure 4:
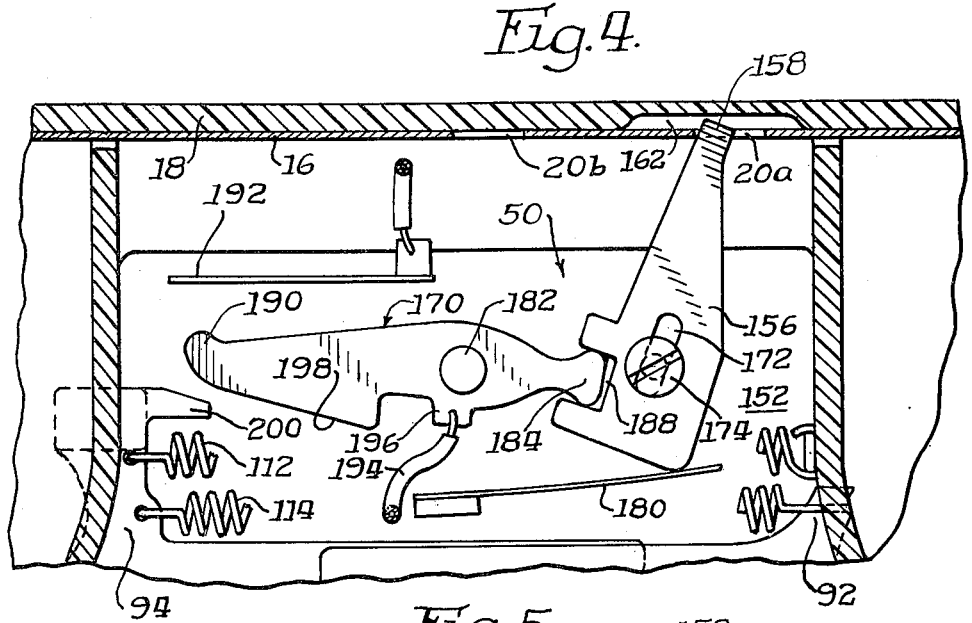
FIGS. 4–6 are views of the film perforation sensor assembly according to the invention with parts displaced to show positions during the sequence of movement of certain parts.

The shutter control plate 92 and the shutter resetting plate 94 of the shutter control assembly 90 cooperate to open and close the shutter blades 96, 98. In a set condition awaiting an exposure, the shutter controlling assembly is oriented as shown in FIG. 2 with the shutter resetting plate 94 and the shutter control plate 92 restrained in set positions against the tension of coiled spring 112 and 114. When set, the coiled spring 114 connects the shutter control plate 92 to the shutter resetting plate 94 to urge the plate to the left as shown in FIG. 2. The shutter resetting plate 94 is coupled by spring 112, see FIG. 4, to a portion of the mechanism support plate of the camera so that the resetting plate is urged to the right. Upon actuation of the camera control button 54, the shutter control plate 92 is first released to be moved under the action of the spring 114 into engagement with a stop lug 116 on the resetting plate 94. The movement of the control plate displaces the shutter 40 to an open condition. By not shown electrical or mechanical latch means, the shutter resetting plate is held for a period of time adequate for proper exposure prior to release. Upon release of the resetting plate, the plate is moved by the spring 112 so that the stop lub 116 drives the shutter control plate back to a shutter closed condition. The forces stored in springs 112, 114 have been expended, the shutter control assembly must be restored for the next exposure. To again re-tension the springs, the shutter resetting plate is returned to a reset condition by the camera drive motor 44 operative through drive components 120, 122 for film advancing and shutter resetting sequences. The motor is powered by a small power source, such as the battery pack 46 and is interconnected with several control circuits, selectively energizeable during operational sequences when mechanisms are to be controlled or driven.

The motor 44, selected to be small and compact, has limited torque output to drive a yoke assembly 122 to which the drive plate 120 is connected for selectively powering camera components as described in more detail in the aforementioned application. The drive plate 120 is supported for sliding movement relative to studs 124 fixed in the mechanism support plate of the camera. The studs pass through elongated slots 126 in the drive plate 120 to limit the excursion of the plate as the yoke member 128 is shifted reciprocably due to rotation of the eccentrically arranged pin 130 of the rotatably drivable disc 122. During a reciprocation cycle of the drive plate to the right as viewed in FIG. 1, the plate causes a gear drive member (not shown) to engage and rotate the take-up driving gear 134 by a few degrees. The take-up driving gear 134 is arranged to extend a small amount into the file cartridge receiving chamber 14 to mesh with the take-up gear 36 of a cartridge located in the chamber. Further, this gear is rotatable and is driven intermittently upon reciprocation of the drive plate 120. During each cycle of the drive plate, the driver member rotates the driving gear approximately 30° to in turn rotate the film take-up hub 34 for winding up a length of film. In this preferred embodiment, several cycles of the drive plate 120 are required for transport of each film frame sufficiently for positioning of an unexposed frame in the exposure aperture 26 of the camera. After each cycle of the drive plate in a film advancing direction, the plate is cycled oppositely. During the shifting, the take-up driver member is re-oriented relatiive to the driver gear 134 to begin a new cycle when the drive plate is again reciprocated to advance film.

The split cycle of operation of the yoke member 122 is seen to be divided such that power from the motor 44 drives the take-up gear 36 only when the drive plate 120 is moving toward the take-up. During the balance of the yoke-drive plate reciprocation cycle, the power from the output of motor 44 is used to drive the shutter resetting plate 94. Attached to the drive plate 120 is a ratchet lever 136 which is biased toward engagement with formations 138 along an edge of the shutter resetting plate. Following two cycles of the drive plate 120 to the left as viewed in FIG. 2, the shutter resetting plate 94 is returned to the shown position, set for another shutter operation sequence.

Upon actuation of the camera control button 54, the cam surface 58 thereof causes link member 60 to pivot about axis 64 to cause releasing of a not shown mechanical latch which has held the shutter control plate 92. Under the urging of the spring 114, the shutter control plate is moved rapidly thereby driving the shutter 40 to an open condition. The extent of movement of the shutter can be limited by the exposure control system represented at 140 in FIG. 3 which may permit a maximum amount of movement. As the shutter opening sequence is initiated, the solenoid control 142 is energized to restrain shutter resetting plate 94 against operation thereby keeping the shutter open until exposure has taken place as light rays impinge on the film. The period of the exposure, determined by the exposure control system is responsive either to the quantity of light reflected from the subject being photographed, or to the actuation of a flash unit represented at 144 in FIG. 3.

After the exposure control system indicates either that an adequate quantity of light for proper exposure has impinged on the film 16 and exposure should be terminated, or that the flash has been fired, the solenoid control 142 releases the resetting plate 94 for movement under the action of the spring 112. By engagement of the return lug 116 of the resetting plate 94 against the shutter control plate 92, both plates are moved to the orientation as seen in FIG. 2. This action causes the shutter mechanism 40 to be closed blocking further light from reaching the film. Through this time frame in a camera operation cycle, the motor has remained de-energized since the last cycle at which time the film was wound and the resetting plate arranged in the set orientation.

Figure 5:
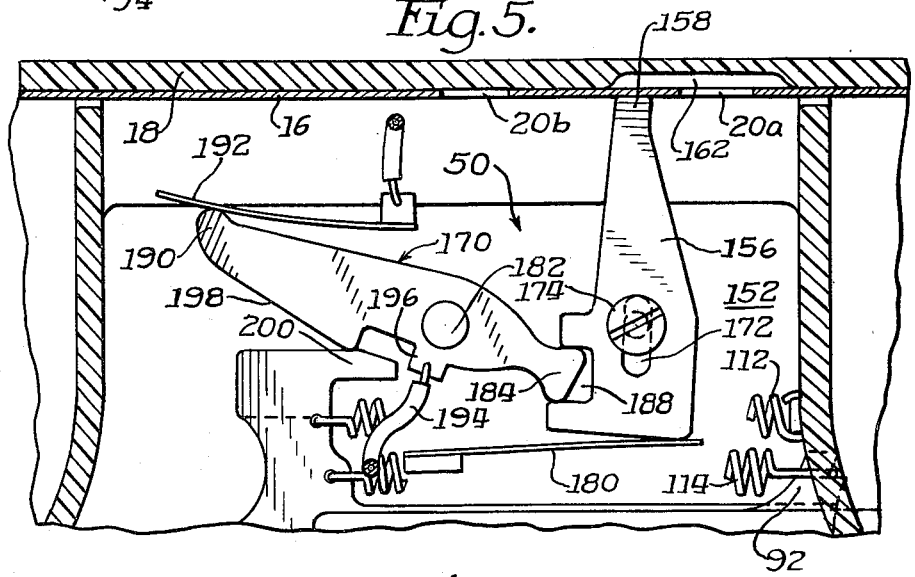
Figure 6:
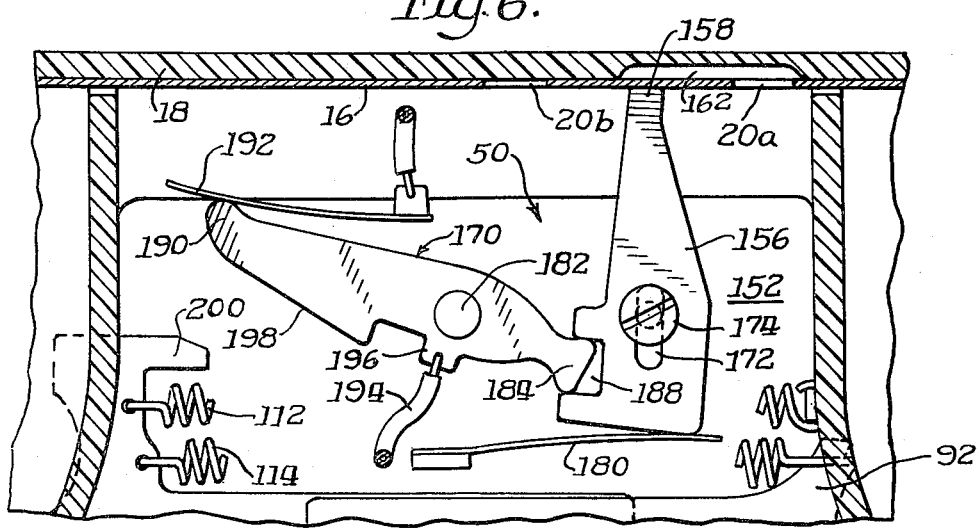

To control the end of the film winding and shutter resetting sequence, the perforations 20 in the film 16 are used to determine that a sufficient length of film has been advanced. Since the shutter resetting cycle of the sequence requires fewer cycles of the drive plate 120 than the film winding cycle, the possibility of the shutter not being completely re-set is avoided. Determination that the film has fully advanced by a frame and that the camera is ready for another exposure sequence is accomplished by the film perforation sensor assembly shown generally as 50 in FIGS. 4–6. In this preferred embodiment, the sensor assembly is mounted to a mechanism support plate 152 enclosed within the camera housing 12 adjacent the film path. Two primary members of the perforation sensing assembly are a sensor member 156 having a film engaging end 158, and a multiplier lever 170. The film engaging end of the sensor member is arranged in the track along which the perforations 20 of a film 16 pass. Further, the film engaging end is substantially aligned with a slight recess 162 formed in the cartridge casing into which that end can move when passing through the perforation of the film and slightly deforming a paper backing (not shown), if used in the cassette. Since the film is only a few thousandths of an inch thick, only a slight movement is necessary to determine if the sensor is engaging the front surface of the film or has passed through the perforation thereof. Thus, the sensor must be capable of consistently responding to this extremely limited movement of the end of the sensor into and through the perforation of the film. Hence, magnification of the movement of the sensor 156 is desirable to enable the assembly to be positively functional through the movement which is only slightly greater than the thickness of the film. To accomplish movement magnification, the multiplier lever 170 is connected with the sensor member 156 proximate the end of the member remote from the film. The lever is designed for cooperation with the shutter resetting blade 94 for controlling the motor energizing circuit represented at 50 in FIG. 3.

The film engaging end 158 of the perforation sensor or feeler member 156 is dimensioned slightly smaller than the size of the film perforations 20. The sensor member has a slot 172 in the body portion thereof through which passes a stud 174 fixed to the mechanism support plate 152 of the camera. The slot-stud connection permits the slightly elongated member to move longitudinally of its length or toward and away from the plane defining the film path; and to pivot about the axis defined by the stud 174. A leaf spring 180 is arranged against the film remote end of the feeler member to continuously urge the member toward the film. Further, the spring engages the feeler member at a corner thereof and at an angle relative to the axis to urge the feeler end of the member toward a normal position, proximate an end of the recess 162. Hence, the film engaging end of the feeler member is lightly but continuously urged to either ride against the film or to enter the film perforation.

The multiplier lever 170 is supported on an axle 182 for pivotal movement when a feeler member coupled end 184 thereof is caused to be moved by displacement of the feeler member 156. This end of the lever is rounded to engage in a receiver 188 formed in the feeler member. At the other end of the lever is formed a lobe 190 for engaging a circuit contact member 192. In this preferred embodiment, the lever is formed of electrically conductive material to serve as a switch component 50 to enable energization of the motor control circuit. A wire 194 connected to the power supply 46 of the circuit is fixed to an ear 196 formed on the lever proximate the axis 182 about which the lever rotates. Further, the lever has formed thereon an inclined surface 198 with which a bumper portion 200 carried by the shutter resetting plate 94 engages. During selected modes of camera operation, the bumper member of the plate is beyond the path of movement of the lever, and therefore will not alter the position thereof. However, in other modes of camera operation as when an exposure, the shutter resetting plate is linearly displaced so that the bumper engages the inclined surface of the lever to positively displace the lever. In the latter orientation of the lever in this preferred embodiment, the engaged end of the lever is pivoted toward the film causing the sensor engaging end 184 to be moved away from the film path. By this action, the sensor member 156 is removed from the perforation to permit transport of the film free of interference by the sensor end 158. Although the active member in this preferred embodiment is the shutter resetting plate, other portions of the shutter controlling assembly may be selected to indicate completion of a shutter operation sequence.

In this camera having a motor powered film advance mechanism, control of the motor energizing circuit is responsive to the position or orientation of several elements of the camera. The circuitry controlled through the sensor assembly 50 is in series connection with the motor 44 by which the film wind mechanism of the camera is powered. That is, after an exposure, the circuitry through the sensor assembly is coupled to energize the camera motor for a period sufficient to set the shutter for another exposure and to advance the film 16 to position the next frame in the exposure aperture 26. At the completion of an exposure sequence, the exposure terminating shutter resetting plate moves the sensor member from a perforation such as 20a by coaction of the bumper 200 against the multiplier lever. Simultaneously, the end 190 of the multiplier lever 170 engages the contact 192 enabling energization of the motor circuit. The perforation sensor member remains withdrawn until the shutter resetting plate is moved to remove the bumper for engagement with the multiplier as the shutter setting and film winding sequence is initiated. The sensor member is then released to bear against the film with slight pressure as the film is transported thereby at a relatively slow rate. Following completion of the shutter setting operation, the film transporting operation continues. That is, the shutter setting operation requires less cycles of the drive plate 120 for completion of that operation han does the film transport operation, thereby always ensuring completion of the shutter setting operation. Since the film transport operation is the measuring step, this step must be completed to de-energize the motor. The sensor has continued to bear against the film enabling motor operation until a perforation in the film permits the member to pass therethrough. As the sensor member enters another perforation such as 20b, the member is moved angularly by a minute amount as the motor continues to drive the film. However, as the end 158 of the sensor 156 enters the perforation, the pivotal and longitudinal movement of the sensor member causes the lobe end 190 of the multiplier lever 170 to be removed from the contact 192. With the opening of the circuit, the motor is de-energized with the motor driven portions of the camera conditioned for another exposure sequence. The perforation sensor member remains in the perforation to maintain the position of the film frame at the exposure aperture to reduce the possibility of film creep relative to that aperture. Such slight movement of film can occur due to the relatively tight wind of the film in the cartridge, particularly, if the loaded camera is stored for an extended period of time or is unduly jostled. Hence, at the next desired time, the camera is ready to be used.

While this invention has been particularly shown and described with the preferred embodiment, it will be understood that various changes and modifications may be made without departing from the spirit and scope of the invention.

What is claimed is:

1. For a still camera having a built-in motor for driving on demand a transport mechanism for moving a film having a perforation proximate each film frame, a shutter operating means and a control system for accurately positioning the film repeatably according to the position of the perforation relative to an exposure aperture, the control system comprising a perforation sensing assembly including:
    perforation sensor means displaceable into and out of engagement with perforations in the film; and
    multiplier means coupled to said sensor means to amplify the movement of said sensor means into and out of a perforation in the film;
    circuit means for controlling energization of the motor;
    contact means in said circuit means for selectively energizing and de-energizing said motor control circuit means responsive to displacement of said perforation sensing assembly into and out of perforations in the film; and
    the shutter operating means being movable into and out of operative engagement with said perforation sensing assembly, said shutter operating means when moved into operative engagement with said perforation sensing assembly causing withdrawal of said sensor means from a perforation and causing initiation of motor energization through said contact in said circuit means
    whereby said motor when energized causes transportation of a length of film until said sensor means senses presence of another perforation at a desired location and through said circuit means de-energizes said motor.

2. The control system as in claim 1 wherein said multiplier means is coupled to said sensor means by a portion in continuing engagement with said sensor means.

3. The control system as in claim 1 wherein said camera includes shutter means including a displaceable member operable according to the condition of said shutter, and cooperating with said perforation sensing assembly for causing withdrawal of said sensor means at the end of an exposure sequence.

4. The control system as in claim 1 wherein said shutter operating means includes shutter control means and shutter setting means, said shutter control means being operable to initiate a shutter open condition, and said shutter setting means being operable to drive said shutter to a shutter closed condition, and to cause withdrawal of said sensor means as said shutter is moved to said closed condition.

5. The control system is in claim 1 including means biasing said sensor means toward engagement with the film.

6. The control system as in claim 1 wherein said sensor means is elongated, and including means supporting said sensor means for longitudinal and pivotal movement.

7. A film perforation sensing assembly for a multiple function camera handling perforated film displaceable intermittently along a film path, the assembly comprising:
   perforation sensor means displaceable into and out of engagement with the perforations in the film.
   means supporting said sensor means for said displacement;
   multiplier means for amplifying movement of said sensor means to and from a perforation of said film, said multiplier means being coupled to said sensor means in continuing engagement therewith
   means supporting said multiplier means for positioning responsive to displacement of said sensor means into and out of a perforation;
   means biasing said sensor means toward a first condition; and
   means of said camera operable responsive to one of the functions of said camera for causing displacement of said multiplier means for moving said sensor means against said biasing means to a second condition.

8. A motor control system for a camera having an electrically powered motor and accepting a film having a perforation proximate each film frame, the camera having a shutter and a film transport mechanism, the motor driving the film transport mechanism and a shutter setting assembly, the control system comprising:
   perforation sensing means including sensor means displaceable from and into a perforation of the film;
   means biasing said sensor means toward engagement in the perforation; and
   multiplier means coupled to said sensor means for movement thereby upon displacement of said sensor means from and into a film perforation;
   circuit means for controlling energization of the motor; and
   contact means arranged in said circuit means and operable by said multiplier means for selectively energizing and de-energizing said circuit means upon displacement of said sensor means from and into a film perforation whereby said motor is energizeable when said perforation sensor means is withdrawn from a perforation and is de-energized when said perforation sensor means is in engagement in a perforation.

9. The control system as in claim 8 wherein said camera includes shutter operating means having a member displaceable according to the condition of said shutter, and said member cooperating with said perforation sensing means for causing withdrawal of said sensor means from a film perforation at the end of an exposure sequence.

10. The control system as in claim 8 wherein said film transport mechanism includes means driven by said motor for positively advancing film in said camera during a sequence when said motor is energized.

11. The control system as in claim 8 wherein said camera includes shutter operating means comprising:
   shutter control means operable to initiate shutter movement to an open condition; and
   shutter setting means operable to initiate shutter movement to a closed condition, said setting means including means cooperating with said perforation sensing means as said shutter reaches the closed condition for withdrawing said sensor means from the film perforation and causing energization of said motor control circuit means whereby said motor is energized until said sensor means enters another perforation.

12. The control system as in claim 11 wherein said shuter setting means of said shutter operating means is displaceable to a sensor means release condition upon initiating re-setting of said shutter for another exposure sequence.

* * * * *